(12) United States Patent
Charra et al.

(10) Patent No.: US 7,650,483 B2
(45) Date of Patent: Jan. 19, 2010

(54) EXECUTION OF INSTRUCTIONS WITHIN A DATA PROCESSING APPARATUS HAVING A PLURALITY OF PROCESSING UNITS

(75) Inventors: Elodie Charra, Antibes (FR); Frederic Claude Marie Piry, Cagnes-sur-Mer (FR); Richard Roy Grisenthwaite, Nr. Royston (GB); Mélanie Emanuelle Lucie Vincent, Grasse (FR); Norbert Bernard Eugéne Lataille, Le Cannet (FR); Jocelyn Francois Orion Jaubert, Antibes (FR); Stuart David Biles, Little Thurlow (GB)

(73) Assignee: ARM Limited, Cambridge (GB)

( * ) Notice: Subject to any disclaimer, the term of this patent is extended or adjusted under 35 U.S.C. 154(b) by 213 days.

(21) Appl. No.: 11/592,337

(22) Filed: Nov. 3, 2006

(65) Prior Publication Data

US 2008/0109639 A1 May 8, 2008

(51) Int. Cl.
*G06F 15/80* (2006.01)
(52) U.S. Cl. .............................. 712/11; 712/16; 712/22
(58) Field of Classification Search ................... 712/11, 712/12, 13, 16, 22
See application file for complete search history.

(56) References Cited

U.S. PATENT DOCUMENTS 5,371,896 A * 12/1994 Gove et al. .................... 712/20
6,216,223 B1 * 4/2001 Revilla et al. ................ 712/245
6,775,766 B2 * 8/2004 Revilla et al. ................ 712/245
6,845,423 B2 * 1/2005 Park .............................. 711/5
7,206,922 B1 * 4/2007 Steiss .......................... 712/216
2003/0061473 A1 * 3/2003 Revilla et al. ................ 712/245
2003/0126351 A1 * 7/2003 Park .............................. 711/5
2006/0095728 A1 * 5/2006 Hammond et al. ........... 712/214
2006/0212663 A1 * 9/2006 Lin et al. ..................... 711/150

* cited by examiner

Primary Examiner—Aimee J Li
(74) Attorney, Agent, or Firm—Nixon & Vanderhye P.C.

(57) ABSTRACT

A data processing apparatus and method are provided for handling execution of instructions within a data processing apparatus having a plurality of processing units. Each processing unit is operable to execute a sequence of instructions so as to perform associated operations, and at least a subset of the processing units form a cluster. Instruction forwarding logic is provided which for at least one instruction executed by at least one of the processing units in the cluster causes that instruction to be executed by each of the other processing units in the cluster, for example by causing that instruction to be inserted into the sequences of instructions executed by each of the other processing units in the cluster. Such a mechanism provides a particularly efficient technique to cause each of the processing units in the cluster to perform an identical operation which can be useful in a variety of situations, for example in an SMP system where coherency of data is required and accordingly maintenance operations need to be performed periodically within each processing unit to ensure such coherency.

18 Claims, 6 Drawing Sheets

EXECUTION OF INSTRUCTIONS WITHIN A DATA PROCESSING APPARATUS HAVING A PLURALITY OF PROCESSING UNITS

BACKGROUND OF THE INVENTION

1. Field of the Invention

The present invention relates to techniques for handling instruction execution within a data processing apparatus having a plurality of processing units.

2. Description of the Prior Art

In a data processing apparatus having a plurality of processing units, for example a plurality of CPUs (Central Processing Units), it is known to arrange at least a subset of those processing units to form a cluster to perform some dedicated processing activity. Often, the actual choice of processing units contained within the cluster is configurable and can change over time. Further, it is often the case that any individual processing unit will not know what other processing units are in the cluster. Typically, each processing unit within the cluster is arranged to execute a sequence of instructions in order to perform associated operations. Often there is a need at certain times for each processing unit to perform a particular operation. For example, when the cluster of processing units are arranged to form a Symmetric Multi-Processor (SMP) system, then the individual processing units need to operate with a coherent view of memory, and it is often necessary for certain cache maintenance operations and the like to be performed in each of the processing units. However, this requirement for each processing unit to perform the same operation is not only restricted to situations where coherency is an issue, and hence for example in other situations it may be desirable to arrange each of the processing units to perform the same operation, but on different sets of data values.

A problem arises in how to efficiently and effectively enable the processing units in the cluster to perform such operations. One known approach is to cause one of the processing units to execute an interprocessor interrupt routine, which results in interrupt signals being sent to the other processing units in the cluster. This will cause the processing units receiving the interrupt signal to halt their current execution, and branch to an interrupt handler which will cause those processing units to execute a specific piece of code so as to cause the required operation to be performed within each of the processing units. However, such an approach gives rise to a significant performance impact, since it requires each of the other processing units to halt their current execution and perform an interrupt handling routine. Further, such a mechanism can be very complex to implement from a software point of view, since there is a significant risk of a deadlock situation arising within the cluster of multiple processors. Such a deadlock situation could arise for example if a first processor becomes stalled waiting for a second processor to perform some action, but that second processor cannot perform that action because the second processor has reached an action point requiring it to send an interrupt to other processors.

Accordingly, it would be desirable to provide an improved technique for enabling operations to be executed by each of the processing units in a cluster.

SUMMARY OF THE INVENTION

Viewed from a first aspect, the present invention provides a data processing apparatus comprising: a plurality of processing units, each processing unit being operable to execute a sequence of instructions in order to perform associated operations, and at least a subset of said processing units forming a cluster; and instruction forwarding logic operable for at least one instruction executed by at least one of the processing units in the cluster to cause that instruction to be executed by each of the other processing units in said cluster.

In accordance with the present invention, instruction forwarding logic is provided which for one or more instructions executed by at least one of the processing units in the cluster will cause that instruction to be executed by each of the other processing units in the cluster. By enabling the instruction to be forwarded and directly executed by the other processing units, this provides a very efficient mechanism for enabling particular operations to be performed in each of the processing units of the cluster. This may be done for coherency purposes, for example to enable certain maintenance operations to be performed within the various processing units forming an SMP system, or alternatively may be used to enable a particular operation to be performed by each of the processing units in the cluster, with each processing unit operating on different data, thereby achieving high performance with regard to such operations.

In one embodiment, the instruction forwarding logic cause the relevant instruction to be executed by each of the other processing units in the cluster by causing that instruction to be inserted into the sequences of instructions to be executed by each of the other processing units in the cluster. This provides a particularly efficient mechanism for enabling particular operations to be performed in each of the processing units of the cluster.

The manner in which the instruction forwarding logic causes an instruction to be inserted into the sequences of instructions executed by the processing units in the cluster can take a variety of forms. However, in one embodiment, each of the processing units in said cluster has decode logic, and the instruction forwarding logic is operable to forward said at least one instruction to the decode logic within each of the other processing units in said cluster to cause that at least one instruction to be inserted into the sequences of instructions to be executed by each of those other processing units. By inserting the instruction directly at the decode stage, the associated operation(s) specified by that instruction can be performed in the standard manner by the execution logic within the processing units, and hence this provides a particularly simple and efficient mechanism for performing such insertion.

The instruction forwarding logic can be provided in a variety of ways. However, in one embodiment, the instruction forwarding logic is provided externally to the processing units, and said at least one of the processing units is operable when executing said at least one instruction to issue a request to the instruction forwarding logic, the instruction forwarding logic comprising forwarding determination logic responsive to the request to determine the other processing units in said cluster and to issue a request to each of those other processing units to cause that instruction to be executed by each of those other processing units. Often, any particular processing unit will not know what other processing units are within the cluster, and accordingly the use of such external instruction forwarding logic enables a determination to be made as to which processing units should be caused to execute the instruction, thereby enabling requests to be directed to only the processing units currently considered to be within the cluster of which the originating processing unit is a part. The forwarding determination logic may be arranged to retain information locally as to which processing units are within the cluster. However, alternatively, each processing unit may be arranged to issue a signal to the forwarding determination logic identifying whether it is or is not within the cluster.

Upon receipt of a request from the originating processing unit, the actual instruction that needs to be executed by each of the other processing units in the cluster may be predetermined. However, in one embodiment there are a number of different instructions that can be caused to be executed in such a manner, and each request issued by the instruction forwarding logic identifies the at least one instruction to be executed. This can for example be done by including the opcode of the instruction in the request sent by the originating processing unit to the instruction forwarding logic, with that opcode then being included in the requests issued by the instruction forwarding logic.

Whilst in some embodiments it is envisaged that only a subset of the processing units in the cluster will be arranged to issue requests to the instruction forwarding logic, in one embodiment each of the processing units in the cluster is able to issue such requests, and the instruction forwarding logic comprises arbitration logic operable to arbitrate between multiple requests in order to select one of those requests for passing to the forwarding determination logic, the arbitration logic being operable to issue an acknowledgement signal to the processing unit that issued the selected request.

In one particular embodiment, each processing unit in the cluster is operable to continue to assert any request issued to the instruction forwarding logic until said acknowledgement signal is received. This simplifies the instruction forwarding logic, since it is not required to buffer requests locally whilst another request is being handled by the instruction forwarding logic.

In one embodiment, each of the processing units in said cluster has instruction fetch logic operable to fetch instructions from memory, and decode logic operable to decode instructions received from the instruction fetch logic, the decode logic being operable to receive any requests issued by the instruction forwarding logic and to insert the at least one instruction into the instructions received from the instruction fetch logic. There are a number of ways in which the decode logic can insert an instruction into the instructions received from the instruction fetch logic. In one embodiment, the decode logic gives priority to any request received by the instruction forwarding logic, and will either locally buffer any instructions received from the fetch logic required to enable it to insert the instruction forwarded from the instruction forwarding logic, or alternatively will communicate with the fetch logic to cause the fetch logic to stop forwarding instructions for one or more cycles in order to enable the instruction received from the instruction forwarding logic to be inserted into the sequence of instructions.

In an alternative embodiment, the instruction forwarding logic is provided within the at least one of the processing units. This can be useful for example in certain embodiments where the processing units forming the cluster is fixed, and accordingly any processing unit containing that instruction forwarding logic can directly forward, for example via a number of hard-wired connections, the required instruction for insertion into the instruction sequences executed by other processing units in the cluster. In one particular such embodiment, one of the processing units in the cluster could be provided with such capability, and the other processing units in the cluster would be able to receive forwarded instructions from that processing unit. This would enable that originating processing unit to cause a particular operation to be performed within each of the processing units of the cluster as and when required.

In one embodiment, at least one of the processing units in the cluster is operable to receive its sequence of instructions from the instruction forwarding logic. Accordingly, in such embodiments, at least one of the processing units receives the entire sequence of instructions via the instruction forwarding logic. This would enable a simplified design for that particular processing unit, since for example that processing unit would not need to be provided with its own instruction fetch logic, associated instruction cache, branch prediction logic, etc.

In some embodiments, the techniques of the present invention can be applied to systems involving multiple clusters. For example, in one embodiment, the data processing apparatus further comprises additional instruction forwarding logic associated with an additional cluster of processing units, the instruction forwarding logic being further operable for said at least one instruction to issue a signal to the additional instruction forwarding logic to cause that instruction to be executed by each of the processing units in said additional cluster. Hence, in such embodiments, when the instruction forwarding logic receives a request to forward an instruction, it will not only forward the instruction to the other processing units in the cluster, but will also forward the instruction via an appropriate request to the additional instruction forwarding logic to cause that instruction to be executed by the processing units of the additional cluster. This would enable some interaction between different clusters to enable those clusters at certain points in time to perform the same operation. Hence for example, the clusters could temporarily be used together to perform a particularly intensive data processing operation with each processing unit performing the operation in respect of different sets of data.

The type of instructions that it may be appropriate to forward can take a variety of forms. However, in one embodiment, the at least one instruction comprises at least one maintenance instruction, and each processing unit in said cluster has maintenance logic operable to perform a maintenance operation specified by said at least one maintenance instruction. This can be useful, for example, when the cluster of processing units are arranged as an SMP system, where data coherency is required between the various processing units. Accordingly, such a maintenance operation may be used to perform certain maintenance tasks, for example in respect of a local data cache within each processing unit, or within particular TLB entries of a table lookaside buffer (TLB) provided within a memory management unit (MMU) of each processing unit.

In one particular embodiment, the maintenance logic within said at least one processing unit is operable when performing said maintenance operation to issue a request to the instruction forwarding logic to cause the associated at least one maintenance instruction to be executed by each of the other processing units in said cluster. Accordingly, in such embodiments, it is the maintenance logic itself which is arranged to issue the request to the instruction forwarding logic. A certain status bit could for example be provided in association with the maintenance operation as is it is routed to the maintenance logic to identify whether that maintenance operation does or does not require forwarding. Alternatively, this information could be encoded within the instruction itself such that when the instruction is decoded within the originating processing unit, control signals are sent to the maintenance logic requiring it to perform the forwarding. In that instance, the instruction as then forwarded by the instruction forwarding logic would be a variant of the original instruction which is a non-forwarding variant so that when that instruction is executed within the recipient processing unit, it is not again forwarded back to the instruction forwarding logic.

As mentioned earlier, the types of instructions that can be forwarded in embodiments of the present invention can take a variety of forms. However, in one embodiment, such instructions are instructions which when executed by each of the other processing units in the cluster cause coherency to be achieved amongst those processing units.

Viewed from a second aspect, the present invention provides a data processing apparatus comprising: a plurality of processing means, each processing means for executing a sequence of instructions in order to perform associated operations, and at least a subset of said processing means forming a cluster means; and instruction forwarding means for causing, for at least one instruction executed by at least one of the processing means in the cluster means, that instruction to be executed by each of the other processing means in said cluster means.

Viewed from a third aspect, the present invention provides a method of operating a data processing apparatus comprising a plurality of processing units, each processing unit executing a sequence of instructions in order to perform associated operations, the method comprising the steps of: forming at least a subset of said processing units as a cluster; and for at least one instruction executed by at least one of the processing units in the cluster, employing instruction forwarding logic to forward that instruction so as to cause that instruction to be executed by each of the other processing units in said cluster.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
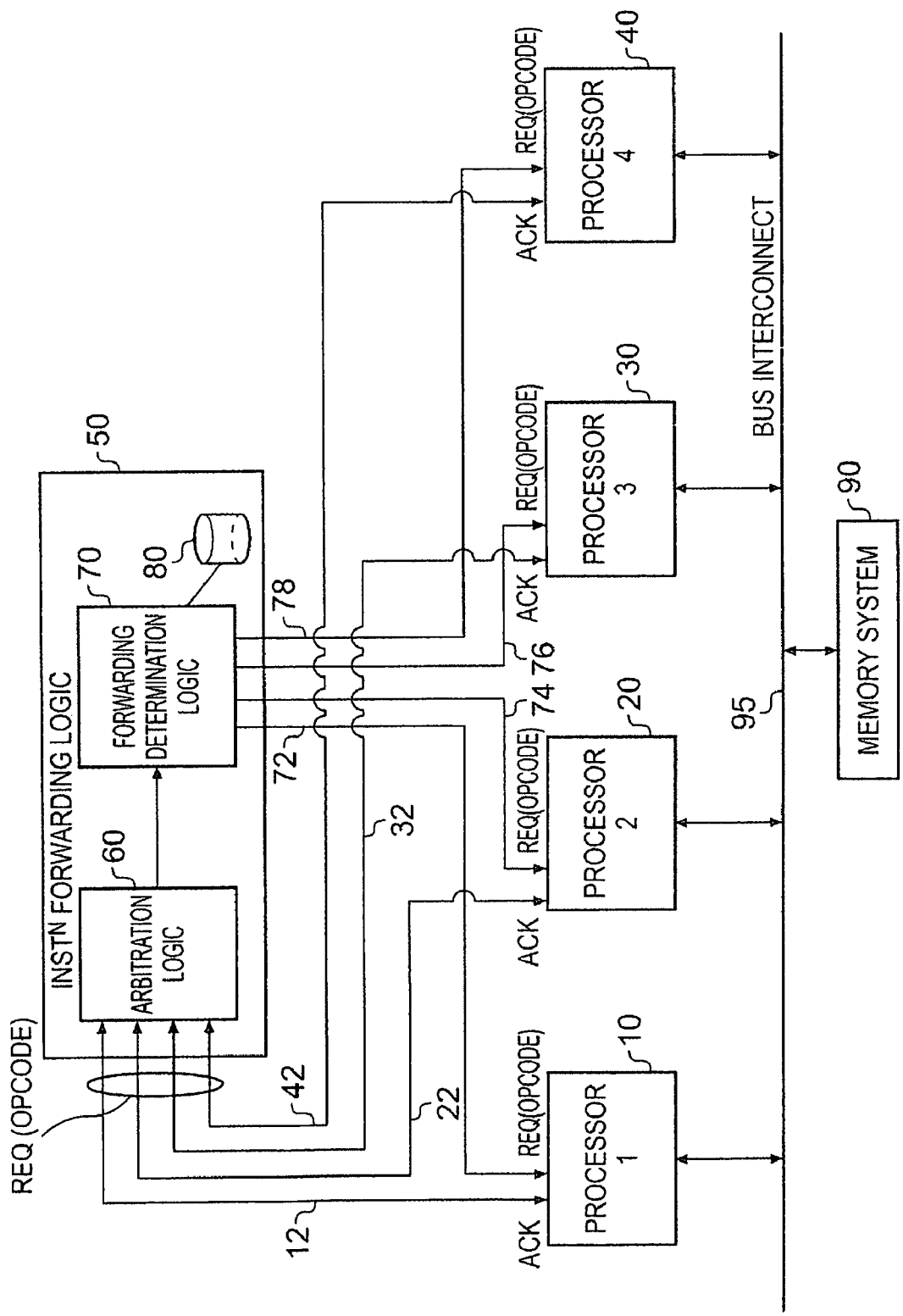
FIG. 1 is a block diagram of a data processing apparatus in accordance with one embodiment of the present invention.

FIG. 1 is a block diagram of a data processing apparatus in accordance with one embodiment of the present invention. As shown in FIG. 1, a plurality of processors 10, 20, 30, 40 are connected via a bus interconnect 95 with a memory system 90. As will be appreciated by those skilled in the art, the memory system may in fact consist of multiple hierarchical levels of memory, including one or more layers of system cache for caching data values for access by the processors. In accordance with embodiments of the present invention, a cluster can be formed of at least a subset of the processors 10, 20, 30, 40 to allow the cluster of processing units to perform some dedicated data processing activity. In one embodiment, the cluster is configurable, so that the actual processors provided within the cluster at any point in time can be varied. Information about which processors form the cluster can be stored within the storage 80 within the instruction forwarding logic 50 shown in FIG. 1, or alternatively each processor may be arranged to output a signal (not shown in FIG. 1) received by the instruction forwarding logic 50 identifying whether it is or is not within the cluster.

In accordance with embodiments of the present invention, each of the processors 10, 20, 30, 40 is coupled with instruction forwarding logic 50 and during times when any of the processors are in the cluster, those processors 10, 20, 30, 40 can issue requests over respective paths 12, 22, 32, 42 to the instruction forwarding logic 50. In particular, each processor can be arranged to execute a sequence of instructions, and one or more of the instructions executed by a processor can be identified as an instruction which requires forwarding to the other processors forming the cluster. As an example, if the cluster of processors are arranged to form an SMP system, they are required to have a coherent view of memory, and as a result there will periodically be a need to perform certain maintenance operations within each processor, for example to invalidate a cache line or update a TLB entry within an MMU's TLB. In accordance with embodiments of the present invention, when a processor executes such a maintenance instruction, it can be arranged to issue a request over its associated request path to the instruction forwarding logic 50, which is arranged to then determine the other processors within the cluster and to issue a request to those processors over respective paths 72, 74, 76, 78 to cause that instruction to be inserted into the sequence of instructions executed by those processors. More details of this mechanism will be described later with reference to FIG. 2.

As can be seen from FIG. 1, the instruction forwarding logic 50 contains arbitration logic 60 which is arranged to receive the various requests over paths 12, 22, 32, 42 and to arbitrate between them in the event that more than one request is pending at the same time. Any of a number of different arbitration schemes can be applied by the arbitration logic, for example based on time of receipt, type of operation specified by the relevant instruction, or based on different priorities associated with different processors 10, 20, 30, 40.

When the arbitration logic selects a request, it sends an acknowledgement back over the path 12, 22, 32, 42 to the originating processor of that request, and forwards the request on to forwarding determination logic 70. On receipt of the acknowledgement, the processor de-asserts its request, and accordingly until such time as an acknowledgement is received the processor will continue to assert its request over the associated path to the arbitration logic 60.

The forwarding determination logic 70 will determine which other processors are within the cluster, as mentioned earlier this being done either with reference to local storage 80 containing such information, or based on signals received directly from each of the processors 10, 20, 30, 40 identifying whether they are or are not within the cluster. Based on the determination made, the forwarding determination logic then issues a request over the relevant paths 72, 74, 76, 78 to the other processors in the cluster, with the request causing the instruction to be inserted into the sequence of instructions executed by those processors.

In one embodiment, it is possible that there is only one instruction that requires such forwarding, and in such instances it will be predetermined what instruction requires execution within the other processing units. However, in an alternative embodiment there are a variety of instructions which can be subjected to such forwarding, and in such embodiments the request signal issued by an originating processor to the arbitration logic 60 will include an identification of the instruction that is to be forwarded, for example by including the opcode of that instruction. Similarly, when the forwarding determination logic outputs requests to the other processors within the cluster, it also will include within those requests an identification of the instruction to be executed, for example by including the opcode within the request signal.

Figure 2:
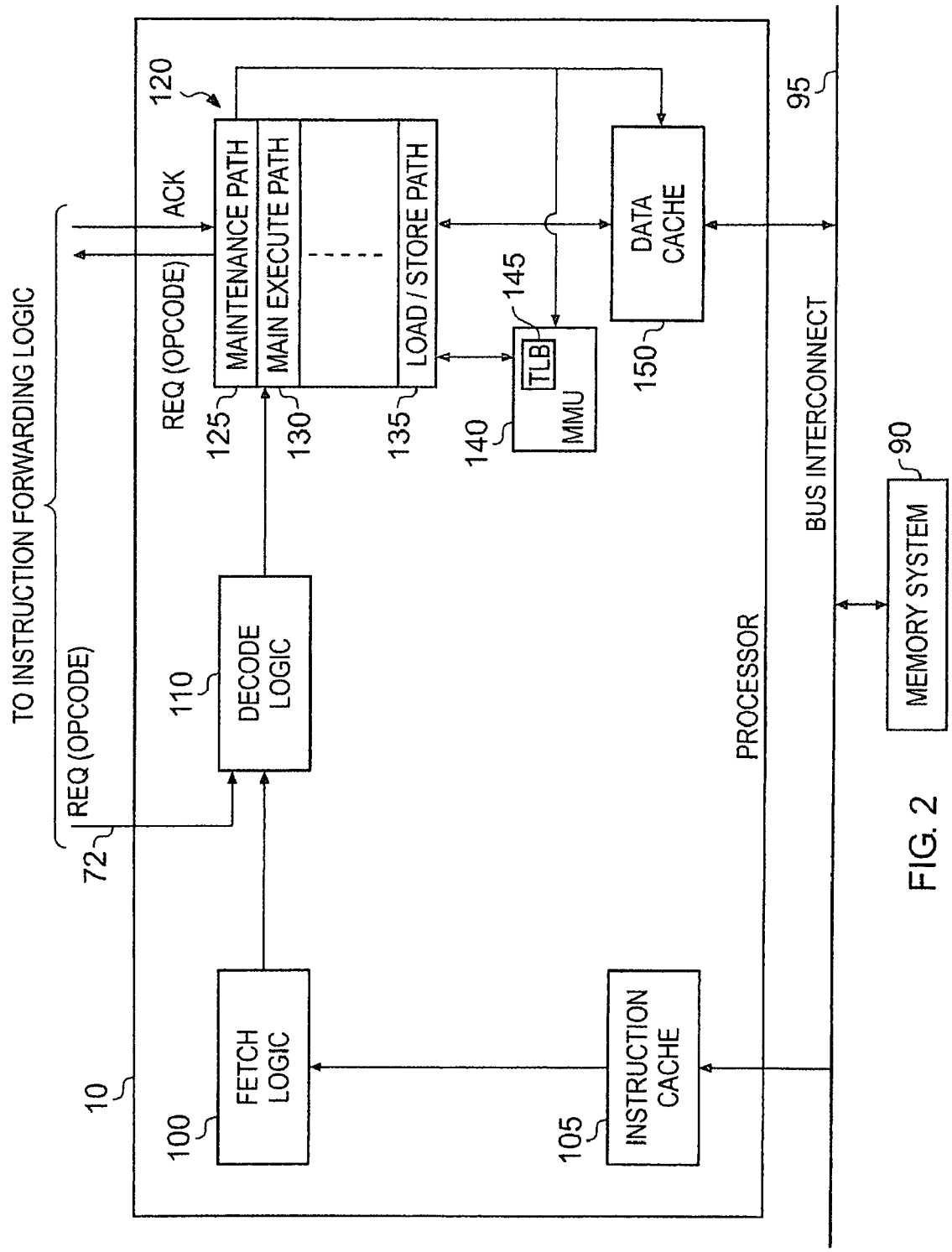
FIG. 2 is a block diagram illustrating in more detail the elements provided within each processor of FIG. 1 in accordance with one embodiment of the present invention.

FIG. 2 is a diagram illustrating in more detail the elements provided within the processor 10 of FIG. 1. In one embodiment, each of the processors 10, 20, 30, 40 is arranged in the same manner, and accordingly can be viewed as having the same construction. As shown in FIG. 2, fetch logic 100 is provided within the processor 10 for fetching instructions to be executed by the processor, these instructions being fetched from an instruction cache 105, which in turn obtains the instructions from the memory system 90 via the bus interconnect 95. The fetched instructions are then forwarded from the fetch logic to decode logic 110 which decodes those instructions and forwards those instructions to appropriate execution paths within execution logic 120. In particular, a main execute path 130 may be provided for performing arithmetic logic operations, a load/store path 135 may be provided for performing load and store operations, a maintenance path 125 may be provided for performing certain maintenance operations in respect of elements within the processor, for example a data cache 150 and a MMU 140, etc.

When a load or store operation is received by the load/store path 135 from the decode logic 110, the load/store path 135 will reference the MMU 140, in order to determine whether that load or store operation is allowed to proceed having regard to the page table descriptor associated with the memory address the subject of that load or store operation. The content of certain page table descriptors are retrieved from the memory system 90 into a TLB 145 within the MMU 140, and identify for example access permissions, region attributes, virtual to physical address translation mappings, etc associated with particular memory regions. Assuming the access permissions identify that the load or store access can proceed, then the load/store path logic will process the load or store operation, accessing the data cache 150 as appropriate. For accesses to cacheable memory regions, if a hit occurs in the data cache, the data can be accessed directly in the data cache, whereas in the event of a miss, the required data will be accessed from the memory system 90, typically this resulting in a cache line's worth of data being retrieved into the data cache 150 to allow the required data value to be accessed in the data cache.

It is often the case within multiprocessor systems that certain maintenance operations need to be performed within each of the processors. These maintenance operations may need to be co-ordinated between the various processors in the cluster, for example where the various processors in the cluster act as an SMP system, and accordingly coherency of data is required.

In accordance with one embodiment of the present invention, when a maintenance instruction is decoded by the decode logic 110 having been provided by the fetch logic 100, appropriate control signals are issued to the maintenance path 125 to cause the required maintenance operation to be performed. As shown in FIG. 2, this may require the maintenance path issuing signals to the data cache 150, for example to invalidate a particular cache line, or issuing signals to the MMU 140, for example to invalidate a particular entry in the TLB 145. Additionally, if the maintenance operation is one which is required to be forwarded to other processors in the cluster, the maintenance path will issue a request to the instruction forwarding logic 50, that request specifying the opcode of the instruction, and when that request is accepted by the arbitration logic 60 the maintenance path will receive an acknowledgement from the arbitration logic. As described earlier with reference to FIG. 1, this will cause the instruction forwarding logic to forward that request to any other processors in the cluster. As shown in FIG. 2, any such requests received from the instruction forwarding logic are routed directly to the decode logic 110 to cause the relevant instruction to be inserted into the sequence of instructions being executed by the processor. Hence, processor 10 may receive over path 72 a request from the instruction forwarding logic in situations where another processor in the cluster has issued a request to the instruction forwarding logic.

Figure 3:
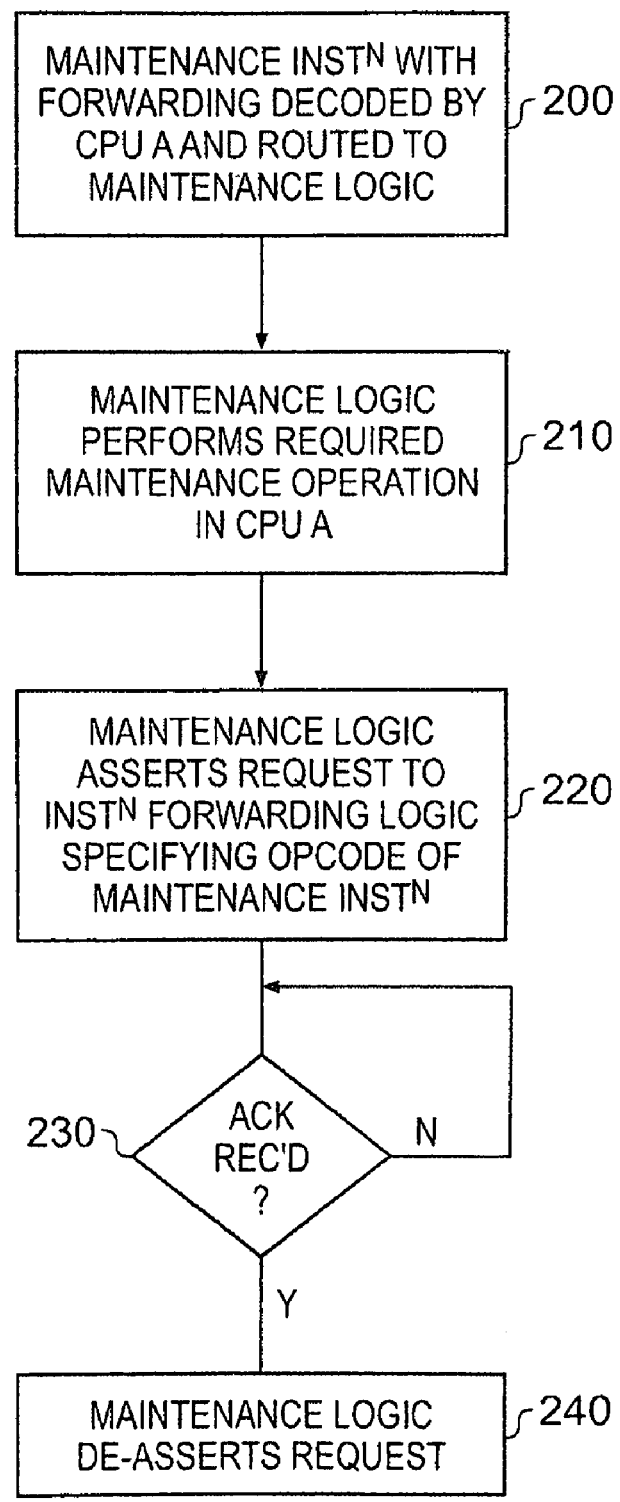
FIG. 3 is a flow diagram illustrating the steps performed by the maintenance path of FIG. 2 in accordance with one embodiment of the present invention.

FIG. 3 is a flow diagram illustrating the operation performed by a processor within the cluster when executing a maintenance instruction of the type that requires forwarding. At step 200, a maintenance instruction of the type that needs forwarding is decoded by the CPU (in FIG. 3 the originating CPU being referred to as CPU A), and is routed from the decode logic to the maintenance path logic. The maintenance path logic then performs the required maintenance operation within CPU A at step 210, and at step 220 asserts a request to the instruction forwarding logic 50 specifying the opcode of the maintenance instruction. Whilst steps 210, 220 are shown as sequential steps, it will be appreciated that steps 210 and 220 can actually be performed in parallel, or indeed the ordering of steps 210 and 220 can be reversed.

Once the request has been asserted by the maintenance path logic, it then waits at step 230 for an acknowledgment to be received from the arbitration logic 60 of the instruction forwarding logic 50. Once an acknowledgement is received, the maintenance logic can then de-assert the request at step 240.

Figure 4:
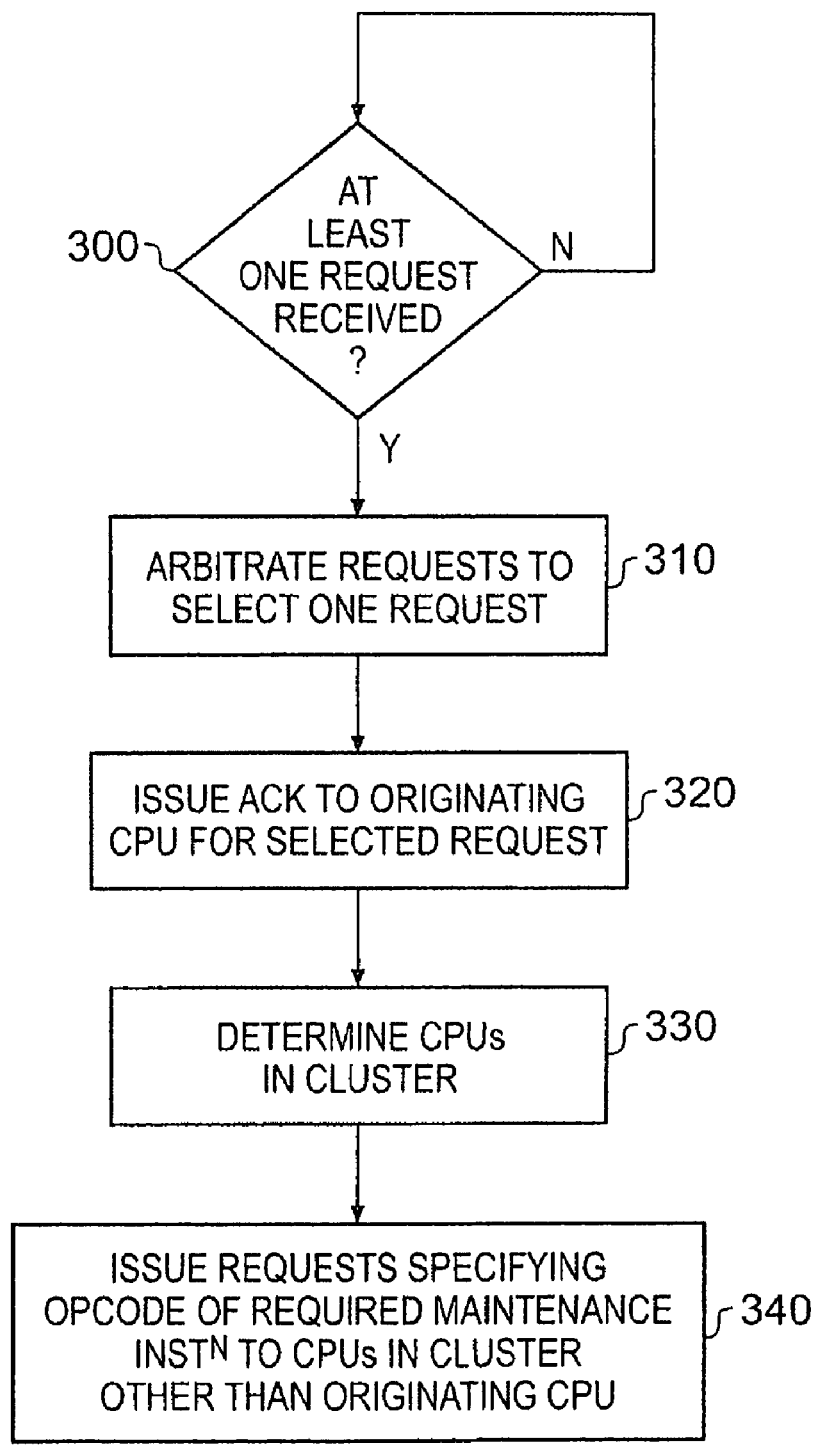
FIG. 4 is a flow diagram illustrating the steps performed by the instruction forwarding logic in accordance with one embodiment of the present invention.

FIG. 4 is a flow diagram illustrating the operation performed by the instruction forwarding logic 50 in accordance with one embodiment of the present invention. At step 300, it is determined whether at least one request has been received by the arbitration logic 60, and in the event that at least one request has been received, the process proceeds to step 310 where the various requests are arbitrated in order to select one of the requests for processing by the instruction forwarding logic. Thereafter, at step 320, the arbitration logic issues an acknowledgement to the originating CPU in respect of the selected request, and then at step 330 the forwarding determination logic 70 determines the other CPUs in the cluster. Thereafter, at step 340, requests are issued to each of the other CPUs in the cluster (other than the originating CPU), those requests specifying the opcode of the required maintenance instruction.

There are a number of ways in which the decode logic 110 receiving a request from the instruction forwarding logic can insert the associated instruction in the sequence of instructions being executed. In one embodiment, the decode logic 110 can be provided with some buffering logic to buffer instructions received from the fetch logic 100 whilst it is inserting the instruction the subject of the request received over path 72. Alternatively, the decode logic 110 may be arranged to output a signal to the fetch logic 100 to cause the fetch logic to stop issuing instructions for one or more cycles whilst the instruction the subject of the request received on path 72 is decoded by the decode logic and routed to the maintenance path.

Whilst in the above description of FIGS. 1 to 4, an embodiment of the present invention has been described having regard to a maintenance instruction which requires execution within each of the processors of a cluster, there are many other types of instructions which could also benefit from being forwarded in such a manner. For example, various data processing instructions, or indeed load or store instructions, may be chosen to be forwarded using the above described mechanism, such that each individual processor within the cluster will perform the associated data processing operation, typically each processor being arranged to act on a different set of data. This can yield significant performance benefits when seeking to perform intensive data processing operations.

Figure 5:
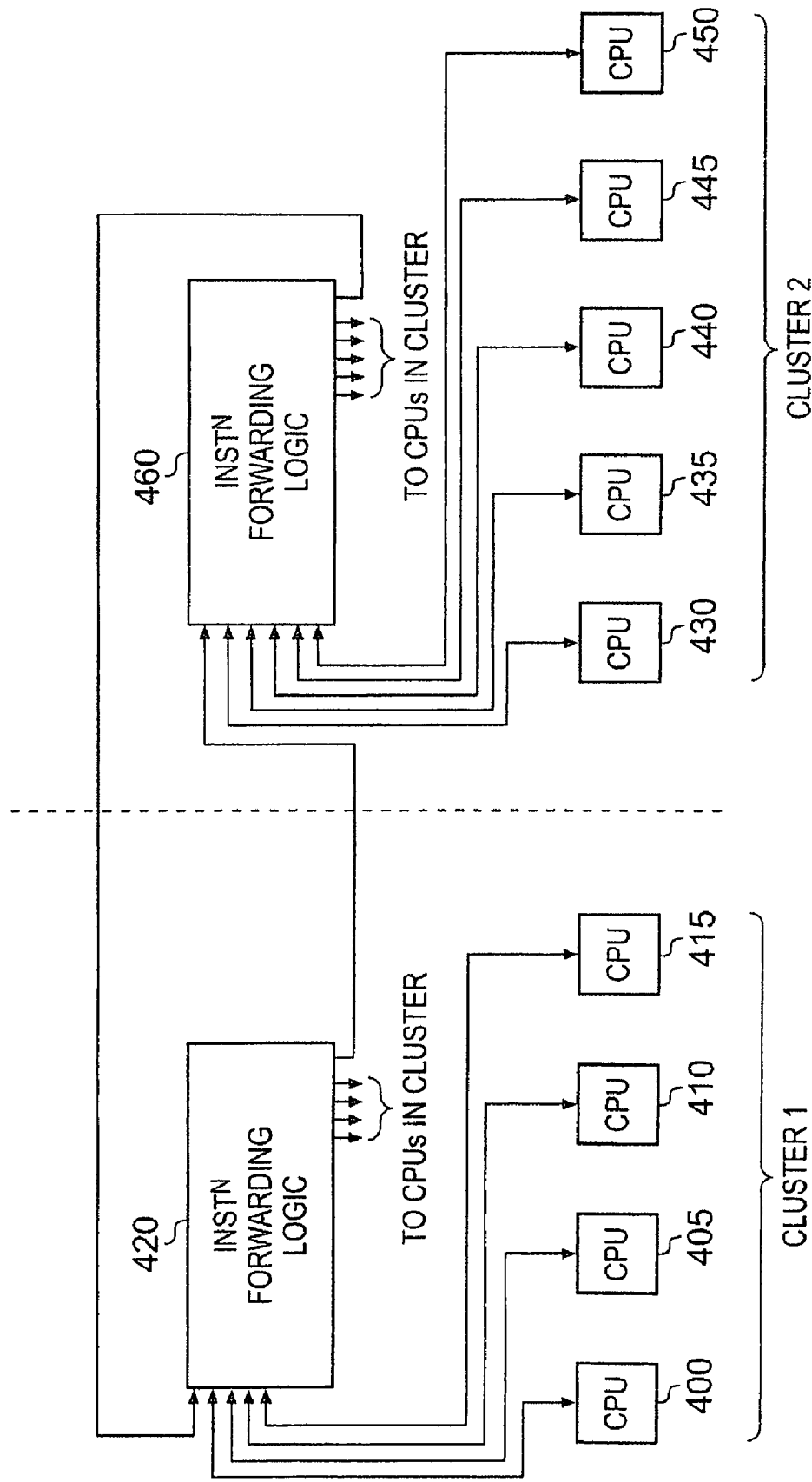
FIG. 5 is a block diagram of an alternative embodiment of the present invention.

The techniques of embodiments of the present invention can also be used to link together a number of different clusters within a data processing apparatus, as is illustrated schematically in FIG. 5. As shown in FIG. 5, a first cluster consisting of CPUs 400, 405, 410, 415 has instruction forwarding logic 420 associated therewith, and a separate cluster consisting of CPUs 430, 435, 440, 445, 450 has further instruction forwarding logic 460 associated therewith. As in the example of FIG. 1, each processor within a cluster can issue requests to its associated instruction forwarding logic to cause instructions to be forwarded. However, in accordance with this embodiment, the instruction forwarding logic is arranged not only to forward the request to any other CPUs in the same cluster, but also to output a request to the other instruction forwarding logic to cause requests to be issued to the CPUs in the other cluster. By this mechanism, it is possible to enable two clusters to temporarily operate together by performing the same operation within the CPUs of each cluster, which may for example be useful when performing intensive data processing operations.

Figure 6:
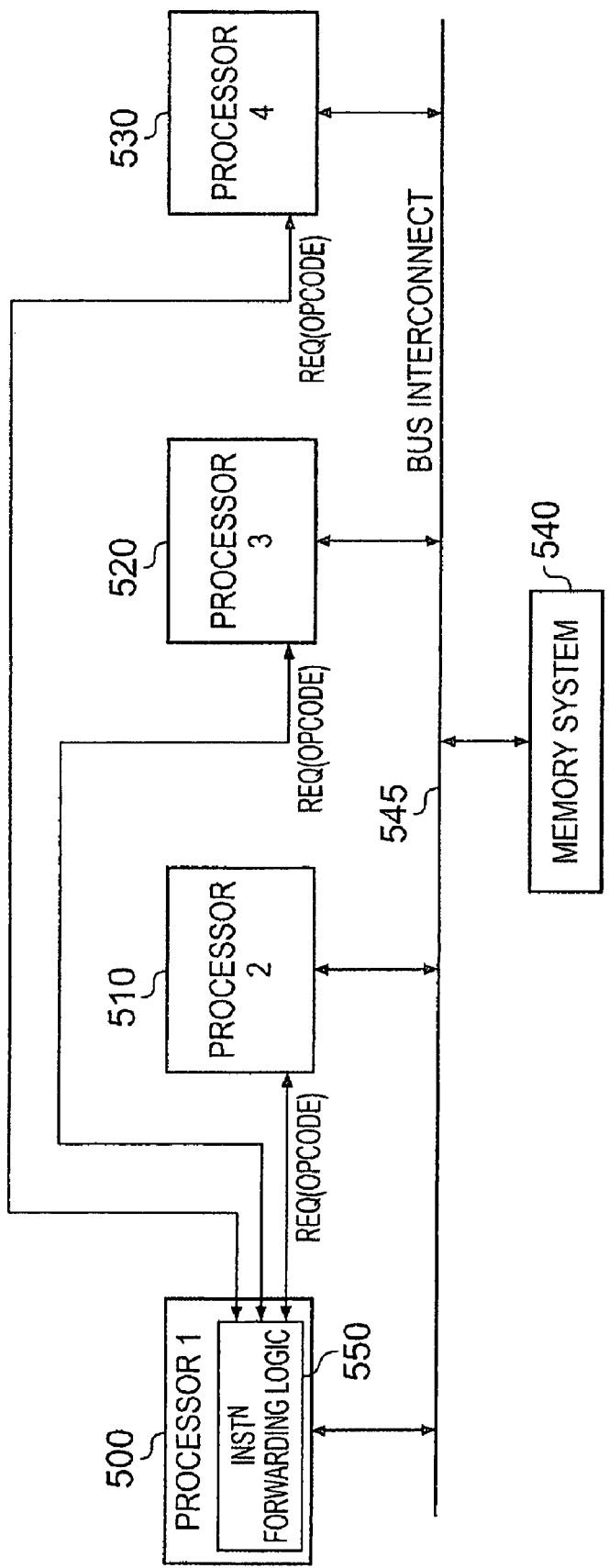
FIG. 6 is a block diagram of a further alternative embodiment of the present invention.

Whilst in FIGS. 1 and 5, the instruction forwarding logic is provided externally to the processors, FIG. 6 illustrates an alternative embodiment in which the instruction forwarding logic is provided within a particular processor of the cluster. In this example, a processor 500 has instruction forwarding logic 550 within it, such that when certain instructions are executed within that processor 500, requests are also issued to each of the other processors 510, 520, 530 within the cluster. In this example, it is assumed that the cluster is fixed, and accordingly the signal lines can be hardwired between the instruction forwarding logic 550 and the other processors 510, 520, 530 within the cluster. It is possible that one or more of the other processors in the cluster could also be provided with separate instruction forwarding logic. However, the approach shown in FIG. 6 is likely to be most useful in situations where only a small subset of the processors within the cluster are provided with such forwarding ability. As with the embodiment of FIG. 1, the plurality of processors 500, 510, 520, 530 are connected via a bus interconnect 545 with a memory system 540.

Considering the example shown in FIG. 6, where only one of the processors has the capability to forward instructions, a dedicated cluster device can be produced where only the first processor 500 is required to have instruction fetch logic, and any associated instruction cache, branch prediction unit, etc and each of the other processors are provided purely to receive and execute instructions forwarded over the associated forwarding paths from the instruction forwarding logic 550. Accordingly, the construction of the processors 510, 520, 530 can be kept relatively simple, and the overall multiprocessor device will be capable of performing certain data processing operations with very high performance, given the ability to perform those operations within each of the processors 500, 510, 520, 530 of the cluster.

From the above description of embodiments of the present invention, it will be seen that such embodiments provide a very efficient technique for causing particular instructions to be executed within each of the processors of a multiprocessor system. Instruction forwarding logic is provided for receiving requests to forward such instructions, to determine the other processors within the cluster, and to cause the request to be propagated on to those other processors so that the instruction is inserted directly into the sequence of instructions executed by those other processors. In particular, the requests output by the instruction forwarding logic can be routed directly to the decode logic within the other processors to cause insertion of those instructions at the decode stage, whereafter those instructions are viewed as standard instructions and cause the associated operations to be performed within the execution logic in the standard manner.

Whilst not restricted to maintenance instructions, such an approach can be particularly beneficial in an SMP system where maintenance operations need to be performed within the processors of the CPU in order to ensure data coherency.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
a plurality of processing units, each processing unit configured to execute a sequence of instructions in order to perform associated operations, and at least a subset of said processing units forming a cluster; and
instruction forwarding logic configured, in response to at least one instruction executed by at least one of the processing units in the cluster, to cause that instruction to be executed by each of the other processing units in said cluster, wherein said at least one of the processing units is configured, when executing said at least one instruction, to issue a request to the instruction forwarding logic, the instruction forwarding logic comprising forwarding determination logic responsive to the request to determine the other processing units in said cluster and to issue a request to each of those other processing units to cause that instruction to be executed by each of those other processing units.

2. A data processing apparatus as claimed in claim 1, wherein the instruction forwarding loge is further configured to cause that instruction to be inserted into the sequences of instructions to be executed by each of the other processing units in said cluster.

3. A data processing apparatus as claimed in claim 2, wherein each of the processing units in said cluster has decode logic, and the instruction forwarding logic is further configured to forward said at least one instruction to the decode logic within each of the other processing units in said cluster to cause that at least one instruction to be inserted into the sequences of instructions to be executed by each of those other processing units.

4. A data processing apparatus as claimed in claim 1, wherein the instruction forwarding logic is provided externally to the processing units.

5. A data processing apparatus as claimed in claim 4, wherein each request issued by the instruction forwarding logic identifies the at least one instruction to be executed.

6. A data processing apparatus as claimed in claim 4, wherein each of the plurality of processing units is configured to issue a signal to the forwarding determination logic to identify whether that processing unit is within said cluster.

7. A data processing apparatus as claimed in claim 4, wherein said at least one of the processing units comprises each processing unit in the cluster, and the instruction forwarding logic comprises arbitration logic configured to arbitrate between multiple requests in order to select one of those requests for passing to the forwarding determination logic, the arbitration logic further configured to issue an acknowledgement signal to the processing unit that issued the selected request.

8. A data processing apparatus as claimed in claim 7, wherein each processing unit in the cluster is configured to continue to assert any request issued to the instruction forwarding logic until said acknowledgement signal is received.

9. A data processing apparatus as claimed in claim 4, wherein each of the processing units in said cluster has instruction fetch logic configured to fetch instructions from memory, and decode logic configured to decode instructions received from the instruction fetch logo, the decode logic further configured to receive any requests issued by the instruction forwarding logic and to insert the at least one instruction into the instructions received from the instruction fetch logic.

10. A data processing apparatus as claimed in claim 9, wherein the decode logic is configured to give priority to any requests received by the instruction forwarding logic.

11. A data processing apparatus as claimed in claim 1, wherein the instruction forwarding logic is provided within the at least one of the processing units.

12. A data processing apparatus as claimed in claim 1, wherein at least one of the processing units in the cluster is configured to receive its sequence of instructions from the instruction forwarding logic.

13. A data processing apparatus as claimed in claim 1, further comprising additional instruction forwarding logic associated with an additional duster of processing units, the instruction forwarding logic being further configured for said at least one instruction to issue a signal to the additional instruction forwarding logic to cause that instruction to be executed by each of the processing units in said additional cluster.

14. A data processing apparatus as claimed in claim 1, wherein said at least one instruction comprises at least one maintenance instruction, and each processing unit in said cluster has maintenance logic configured to perform a maintenance operation specified by said at least one maintenance instruction.

15. A data processing apparatus as claimed in claim 14, wherein the maintenance logic within said at least one processing unit is configured, when performing said maintenance operation, to issue a request to the instruction forwarding logic to cause the associated at least one maintenance instruction to be executed by each of the other processing units in said cluster.

16. A data processing apparatus as claimed in claim 1 wherein the at least one instruction executed by said at least one of the processing units in the cluster is such that when that instruction is executed by each of the other processing units in said cluster, coherency is achieved amongst the processing units in the cluster.

17. A data processing apparatus comprising:
a plurality of processing means, each processing means for executing a sequence of instructions in order to perform associated operations, and at least a subset of said processing means forming a cluster means; and
instruction forwarding means for causing, for at least one instruction executed by at least one of the processing means in the cluster means, that instruction to be executed by each of the other processing means in said cluster means, wherein said at least one of the processing means is configured, when executing said at least one instruction, to issue a request to the instruction forwarding means, the instruction forwarding means comprising forwarding determination means responsive to the request to determine the other processing means in said cluster and to issue a request to each of those other processing means to cause that instruction to be executed by each of those other processing means.

18. A method of operating a data processing apparatus comprising a plurality of processing units, each processing unit executing a sequence of instructions in order to perform associated operations, the method comprising the steps of:
forming at least a subset of said processing units as a cluster; and
for at least one instruction executed by at least one of the processing units in the cluster, employing instruction forwarding logic to forward that instruction so as to cause that instruction to be executed by each of the other processing units in said cluster, when executing said at least one instruction, said at least one processing unit issue a request to the instruction forwarding logic, the instruction forwarding logic, responsive to the request, for determining the other processing units in said cluster and for issuing a request to each of those other processing units to cause that instruction to be executed by each of those other processing units.

* * * * *